MOSES F. GALE.

Improvement in Cigar Lighters.

No. 5,010. Reissued July 30, 1872.

Moses F. Gale

Witnesses:
Thos. A. Simmons
Joshua Kidd

A.M. PHOTO-LITHOGRAPHIC CO. N.Y. (OSBORNE'S PROCESS.)

UNITED STATES PATENT OFFICE.

MOSES F. GALE, OF NEW YORK, N. Y.

IMPROVEMENT IN CIGAR-LIGHTERS.

Specification forming part of Letters Patent No. 121,049, dated November 21, 1871; reissue No. 5,010, dated July 30, 1872.

*To all whom it may concern:*

Be it known that I, MOSES F. GALE, of the city, county, and State of New York, have invented a new and Improved Cigar-Lighter; and I do hereby declare that the following is a full, clear, and exact description thereof, which will enable others skilled in the art to make and use the same.

Figure 1:
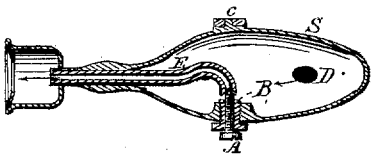
Figure 2:
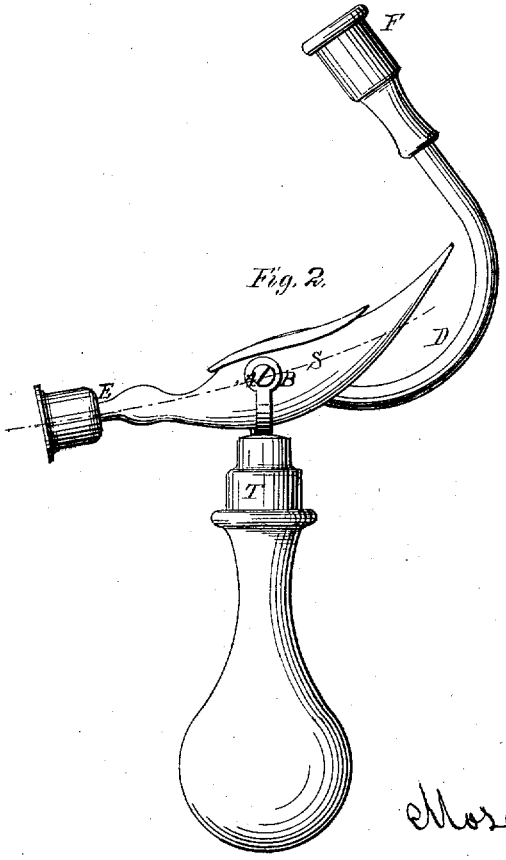

Figure 1 is a ground plan or section. Fig. 2 is an elevation of the same.

Similar letters represent similar parts.

My improvement in cigar-lighters consists in an ornamental mechanical device so arranged that the exit of gas for lighting cigars is regulated or adjusted by the point of a conical screw moving in an outer screw concealed in the body of a bird or other device. This screw, moving outside of a conical screw, together with a projecting pin placed on the opposite side of the bird, acts as the fulcrum, from which is suspended a handle, the weight of which handle partially shuts off the gas by driving the conical screw nearer its seating. The rising or falling of said handle causes the bird or other device to turn or oscillate on said fulcrum, thus opening and also partially closing the exit of gas.

S shows the bird; T, the handle, suspended by a fork from the fulcrum B and C. D shows the gas-inlet; E, the outlet; and the arrows show the direction of the gas-current. The device is attached at F, by means of a flexible tube, to the gas-supply. The outer screw A is for adjusting the flow of gas to suit the requirements of the user. Screw A is made to fit snugly into outer screw B, so that when adjusted it will only move with the fulcrum or outer screw B. C is simply a projecting pin.

I claim as new—

1. The combination of screws A and B, fixed in a bird or other ornamental device, when used for the purpose set forth.
2. In combination with handle T provided with a fork, the screws A and outlet E.
3. The combination of the parts A, B, C, and T.

MOSES F. GALE.

Attest:
O. S. D. PECK,
JOSHUA KIDD.